United States Patent
Franke et al.

(10) Patent No.: US 10,228,446 B2
(45) Date of Patent: Mar. 12, 2019

(54) DETERMINING THE POSITION OF SENSOR NODES OF A SENSOR NETWORK

(71) Applicants: Fraunhofer-Gesellschaft zur Förderung der angewandten Forschung e.V., München (DE); Friedrich-Alexander-Universität Erlangen-Nürnberg, Erlangen (DE)

(72) Inventors: Norbert Franke, Erlangen (DE); Gerd Kilian, Erlangen (DE); Christian Forster, Nürnberg (DE); Hans-Martin Tröger, Erlangen (DE); Jörn Thielecke, Erlangen (DE); Jörg Robert, Uttenreuth (DE); Markus Hartmann, Sulzbach-Rosenberg (DE)

(73) Assignees: Fraunhofer-Gesellschaft zur Förderung der angewandten Forschung e.V., München (DE); Friedrich-Alexander-Universitat Erlangen-Nurnberg, Erlangen (DE)

( * ) Notice: Subject to any disclaimer, the term of this patent is extended or adjusted under 35 U.S.C. 154(b) by 87 days.

(21) Appl. No.: 15/531,839

(22) PCT Filed: Nov. 25, 2015

(86) PCT No.: PCT/EP2015/077688
§ 371 (c)(1),
(2) Date: May 31, 2017

(87) PCT Pub. No.: WO2016/087287
PCT Pub. Date: Jun. 9, 2016

(65) Prior Publication Data
US 2017/0328979 A1    Nov. 16, 2017

(30) Foreign Application Priority Data
Dec. 3, 2014   (DE) .................. 10 2014 224 797

(51) Int. Cl.
*H04W 24/00*  (2009.01)
*G01S 5/12*   (2006.01)
(Continued)

(52) U.S. Cl.
CPC ............. *G01S 5/12* (2013.01); *G01S 5/0289* (2013.01); *H04L 67/12* (2013.01);
(Continued)

(58) Field of Classification Search
CPC ......... G01S 5/12; G01S 5/0289; H04L 67/12; H04M 1/72519; H04M 1/72522; H04W 88/02; H04W 4/02; H04W 8/245
(Continued)

(56) References Cited

U.S. PATENT DOCUMENTS

| | | |
|---|---|---|
| 6,861,984 B2 | 3/2005 | Rabinowitz et al. |
| 7,050,787 B2 | 5/2006 | Caci |

(Continued)

FOREIGN PATENT DOCUMENTS

| | | |
|---|---|---|
| WO | WO-03041388 A2 | 5/2003 |
| WO | WO-2011120213 A1 | 10/2011 |

OTHER PUBLICATIONS

"German Application Serial No. DE 10 2014 224 797, Office Action dated Apr. 21, 2015", (Apr. 21, 2015), 5 pgs.
(Continued)

*Primary Examiner* — Danh C Le
(74) *Attorney, Agent, or Firm* — Schwegman Lundberg & Woessner, P.A.

(57) ABSTRACT

The invention relates to a method for determining the position of a first sensor node relative to a second sensor node, wherein the first and the second sensor nodes are communicatively connected to each other and are a constituent part of a sensor network, comprising the method steps: reception of signal sections of transmitted signals
(Continued)

from at least two transmitters by the first and the second sensor node, beginning at a time $t_1$ for a time period $t_{RX}$; determining the angle of incidence of the transmitted signals to at least one of the sensor nodes; determining the distance between the sensor nodes from the propagation time differences of the transmitted signals from the at least two transmitters received at the first and second sensor nodes; determining the position of the first sensor node relative to the second sensor node from the distance between the sensor nodes and the angle of incidence of the transmitted signals, wherein the sensor nodes determine the time $t_1$ and the time period $t_1$ in relation to a reference frequency which is derived from the received transmitted signal from at least one of the transmitters.

20 Claims, 3 Drawing Sheets

(51) Int. Cl.
*G01S 5/02* (2010.01)
*H04L 29/08* (2006.01)
*H04M 1/725* (2006.01)
*H04W 8/24* (2009.01)
*H04W 88/02* (2009.01)

(52) U.S. Cl.
CPC .... *H04M 1/72519* (2013.01); *H04M 1/72522* (2013.01); *H04W 8/245* (2013.01); *H04W 88/02* (2013.01)

(58) Field of Classification Search
USPC .................................. 455/456.1, 550.1, 418
See application file for complete search history.

(56) References Cited

U.S. PATENT DOCUMENTS

| | | | |
|---|---|---|---|
| 8,054,762 B2* | 11/2011 | Potkonjak | G01S 5/0226 370/254 |
| 8,063,825 B1 | 11/2011 | Yang | |
| 9,689,958 B1* | 6/2017 | Wild | G01S 3/8003 |
| 2005/0286611 A1 | 12/2005 | Priotti | |
| 2010/0085242 A1* | 4/2010 | Kim | G01S 5/0289 342/145 |
| 2013/0070751 A1 | 3/2013 | Atwal et al. | |
| 2014/0204902 A1* | 7/2014 | Maltsev | H04W 36/0083 370/331 |
| 2015/0257121 A1* | 9/2015 | Siomina | H04W 64/003 455/456.6 |
| 2016/0014791 A1* | 1/2016 | Liu | H04W 72/082 370/252 |
| 2016/0134372 A1* | 5/2016 | Yogeeswaran | H04B 10/1129 398/156 |
| 2016/0223313 A1* | 8/2016 | Vierkotten | B66C 13/46 |
| 2016/0306038 A1* | 10/2016 | Zoeke | G01S 17/58 |
| 2017/0284839 A1* | 10/2017 | Ojala | H04L 67/12 |

OTHER PUBLICATIONS

"International Application No. PCT/EP2015/077688, International Search Report dated Feb. 18, 2016", w/ English Translation, (Feb. 18, 2016), 9 pgs.
"International Application No. PCT/EP2015/077688, Written Opinion dated Feb. 18, 2016", (Feb. 18, 2016), 6 pgs.
"International Application No. PCT/EP2015/077688, International Preliminary Report on Patentability dated Jun. 15, 2017", (Jun. 15, 2017), 7 pgs.

* cited by examiner

DETERMINING THE POSITION OF SENSOR NODES OF A SENSOR NETWORK

PRIORITY APPLICATIONS

This application is a U.S. National Stage Filing under 35 U.S.C. 371 from International Application No. PCT/EP2015/077688, filed on 25 Nov. 2015, and published as WO2016/087287 on 9 Jun. 2016, which claims the benefit of priority to German Application No. 10 2014 224 797.7, filed on 3 Dec. 2014; which applications and publication are incorporated herein by reference in their entirety.

The invention relates to a method for determining the position of sensor nodes of a sensor node network according to the preamble of the main claim and to a system having a sensor network and at least two transmitters for executing the method.

Sensor networks for acquiring sensor data of a plurality of sensors are employed for a variety of applications. For example, meter readings for power, gas, or water meters may be acquired by sensors that are connected communicatively to other sensors and/or to another node, such as a server for transmitting their sensor data. A sensor having a communication unit for transmitting the sensor data and possibly other data is called a sensor node here.

A plurality of such sensor nodes forms a sensor network. The sensor nodes may be communicatively connected to one another, directly or indirectly, within the sensor network in a wide variety of different ways. Likewise, the sensor nodes of the sensor network may be communicatively connected, directly or indirectly, to another node, such as a server.

Frequently, for evaluating the sensor data of such a sensor network, knowing the position of the individual sensor nodes within the sensor network is important, for instance, for assigning the sensor data to a specific position. To this end, for instance, the positions of the sensor nodes of the sensor network may be determined relative to one another or with respect to a reference coordinate system. A high degree of accuracy in determining the position is desired and should be in the decimeter range.

Determining the positions of a plurality of sensor nodes of a sensor network is associated with great complexity. For instance, the positions of the sensor sites may be determined in a map. In addition to the high manual effort required, this method has the drawback of limited accuracy, because the accuracy of determining the position is directly dependent on the availability of maps with the necessary accuracy. Methods for automatically determining the position by means of radio-navigation methods, such as, for instance, by means of satellite-supported GPS systems, offer another option. However, these methods require a special receiver in each sensor node, which results in additional hardware costs. In addition, when using GPS, determining a position with a deviation of less than 5 meters is only possible with the D-GPS method. The use of D-GPS is associated with additional complexity, however, since a reference receiver in the geographic vicinity of the sensor network is required. In addition, GPS-based methods for determining position require line-of-sight from the reception site to the satellites, which is not available inside of buildings, for instance.

A method for determining position that is also suitable for indoor applications is based on the use of so-called "signals of opportunity." A radio signal that is emitted for a purpose other than determining position is caned a signal of opportunity. Radio signals whose properties permit determination of position with the required accuracy may be used as signals of opportunity.

Television or broadcast signals (DVB-T, DAB) or even signals from communications networks (GSM, UMTS, LTE), for instance, are suitable as signals of opportunity. The signals are generally emitted at high transmitting power from a plurality of different sites within a geographical area and may also be received with a good signal-to-noise ratio in buildings without line-of-sight to the transmitter. In addition, these signals have features such as high frequency stability and characteristic signal sequences that permit determination of position using these signals.

Determining the position by means of signals of opportunity is based on determining the signal propagation times of the transmitted signals from a plurality of transmitters with known sites to the receiver at an unknown site.

Such a method was published, for instance, in U.S. Pat. No. 6,861,984 B2. It is a drawback of this method that the position of the transmitter sites must be known. It is also disadvantageous that special receiving stations are required at known sites, for instance to determine the influence of the atmospheric conditions on the signal propagation time and to take this into account for determining the position. In addition, the attainable accuracy for position determination is only about one meter.

U.S. Pat. No. 8,063,825 B1 discloses a method that is based on determining the signal propagation time difference between signals of opportunity received by two receivers. One drawback of this method is the required determination of the offset of the time bases for the receivers.

Given the prior art, the underlying object of the present invention is to provide a method for determining the position of the sensor nodes of a sensor network such that improved accuracy is possible and simpler to realize in determining the position.

The object is attained with the method according to patent claim 1. The other patent claims provide advantageous embodiments of the inventive method.

A method for determining the position of a first sensor node relative to a second sensor node is provided that is based on measuring the propagation time difference of the signals of opportunity between arrival at the first sensor node and arrival at the second sensor node and on determining the angle of incidence of the signals of opportunity at the sensor node. Measuring the propagation time difference has the advantages that the measurement may be made with higher accuracy compared to known methods and that the influence of atmospheric conditions on the measurement is minimized. Since for determining the position of the sensor nodes it is only necessary to determine the signal propagation time of the signals of opportunity between the sensor nodes and to determine their angles of incidence to the sensor nodes, it is not necessary to know the position of the sites of the transmitters of the signals of opportunity for determining the position.

The sensor network and at least one transmitter that emits a signal of opportunity form a system, then, in which the position of the sensor nodes may be determined.

One aspect of the present invention relates to a method for determining the position of a first sensor node relative to a second sensor node, wherein the first and the second sensor nodes are communicatively connected to one another and are a constituent part of a sensor network, having the method steps:

receiving signal segments of transmitted signals from at least two transmitters by the first and the second sensor nodes, beginning at time $t_1$ for a time period $t_{RX}$;

determining the angle of incidence of the transmitted signals to at least one of the sensor nodes;

determining the distance between the sensor nodes from the propagation time differences of the transmitted signals of the at least two transmitters received at the first and second sensor nodes;

determining the position of the first sensor node relative to the second sensor node from the distance between the sensor nodes and the angle of incidence of the transmitted signals, wherein the sensor nodes determine the time $t_1$ and the time period $t_{RX}$ relative to a reference frequency that is derived from the received transmitted signal of at least one of the transmitters.

In one embodiment of the method, the transmitters are configured to emit an OFDM-modulated transmit signal. The sensor nodes are configured to receive an OFDM-modulated signal. An OFDM-modulated signal advantageously permits a simple determination of a highly accurate reference signal from the transmitted signal. In particular signals from transmitters that emit DVB-T or even LTE signals are particularly suitable, since the transmitted signals are generated based on a highly accurate reference frequency.

The sensor nodes, then, are configured to determine the reference frequency by means of a correction signal obtained from the OFDM-modulated transmitted signal.

The correction signal may be determined by the sensor nodes using a phase comparison of at least two individual carriers of the transmitted signal. The phase comparison includes the evaluation of a phase difference, a phase comparison of an individual carrier of the transmitted signal to an individual carrier of the transmitted signal received immediately prior, or a comparison of the transmitted signal to a signal that was generated by modulation of the demodulated transmitted signal. A phase difference may be determined, for example, as the difference of the phases of two successive symbols or relating the currently received symbol to a static reference symbol. Higher accuracy may be attained by averaging correction signals determined over a prolonged time period.

The propagation time difference may be determined as the maximum of the autocorrelation function of the signal segments of the transmitted signal received by the first and second sensor nodes. The propagation time difference may be determined with great accuracy in an advantageous manner by means of the autocorrelation function of two signals received at different times.

The angle of incidence of the transmitted signal may be determined from the propagation time difference of the signals received by a sensor node having a plurality of spatially separated antennas.

The signal segments of a transmitter that are received by the sensor nodes may comprise signal segments of a plurality of transmitted signals emitted at different frequencies. Greater accuracy in determining the propagation time difference may be attained using the higher bandwidth.

The position of the first sensor node may be determined in the first sensor node, wherein the second sensor node transmits the signals segments of the transmitted signals it received and the angle of incidence of the transmitted signals to the first sensor node.

The transmitted signals for determining the position may also be emitted by the sensor nodes themselves.

The invention shall be explained in greater detail in the following using exemplary embodiments. The attached drawings are as follows:

FIG. 1 depicts two sensor nodes RX1 and RX2, which, as indicated by the broken line, are communicatively connected to one another and form a sensor network SNW having the extension $d_{SNW}$. The sensor network may comprise additional sensor nodes that are not depicted in FIG. 1. The sensor nodes may also be communicatively connected to other nodes within or outside of the sensor network. FIG. 1 furthermore depicts two stationary transmitters ($TX_{SoO1}$, $TX_{SoO2}$), which emit signals designated as signals of opportunity. The distance from the two transmitters to the sensor network SNW is greater by a multiple than the extension of the sensor network.

Figure 1:
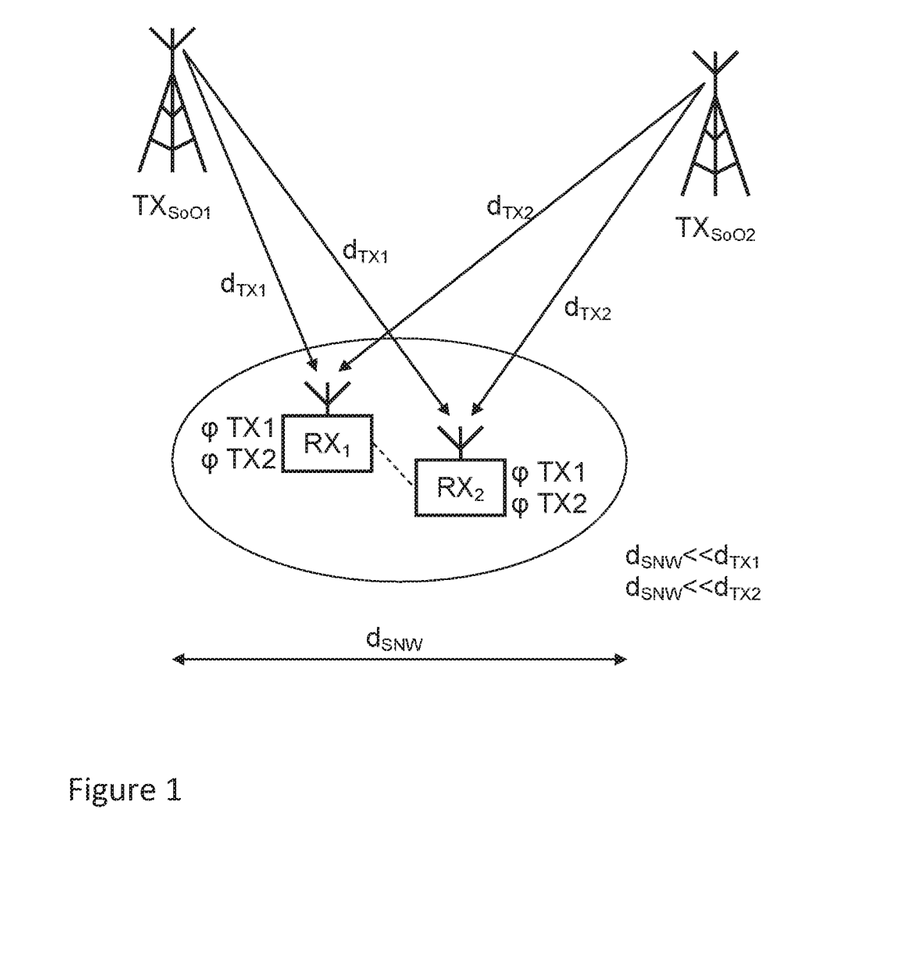
FIG. 1 depicts an inventive system having a sensor network and two stationary transmitters.

A sensor node comprises any desired sensor, a known type of communication unit for data communication with one or a plurality of other sensor nodes and/or with a central node such as a server and a receiver for receiving a signal of opportunity. The sensor node may also comprise a transmitter. Receivers and transmitters alike may be used for the communicative connection and for determining the position.

A sensor, which is also called a detector, sensing element, or probe, shall be construed to be a technical component that can qualitatively detect, or quantitatively detect as a measured value, certain physical or chemical properties (e.g.; heat radiation, temperature, humidity, pressure, sound, brightness, or acceleration) and/or the material quality of its surroundings. These variables are detected by means of physical or chemical effects and are converted to an electrical signal that may be further processed, which is also called a sensor signal.

In addition, the sensor nodes may also have means, which are described in greater detail in the following, for determining the angle of incidences of the signal of opportunity.

The known type of communication unit may be embodied wired, for instance, with Ethernet or the like, or even wireless using technologies such as WLAN, GSM, UMTS, LTE, or the like.

In the following exemplary description of determining the position of a second sensor node relative to a first sensor node in a sensor network, the second sensor node shall be called the "sensor node" and the first sensor node shall be called the "anchor node." The position of the anchor node is the reference position for determining the position of the second sensor node. For the sake of simplicity, the position (0,0) at the origin of a two-dimensional coordinate system (x, y) is assumed for the anchor node.

In this exemplary embodiment it is assumed that the determination of the position occurs in the sensor node, wherein the anchor node transmits to the sensor node, via a communication connection, additional data that are necessary for determining the position in the sensor node. Likewise, the determination of the position may also occur in the anchor node or any other node, provided the data required for this are transmitted there.

If the position of the anchor node is known in a coordinate system, such as for instance a geographical coordinate system such as WGS84, the position of each sensor node in this coordinate system may be determined using the positions of the sensor nodes relative to the anchor node.

Figure 2:
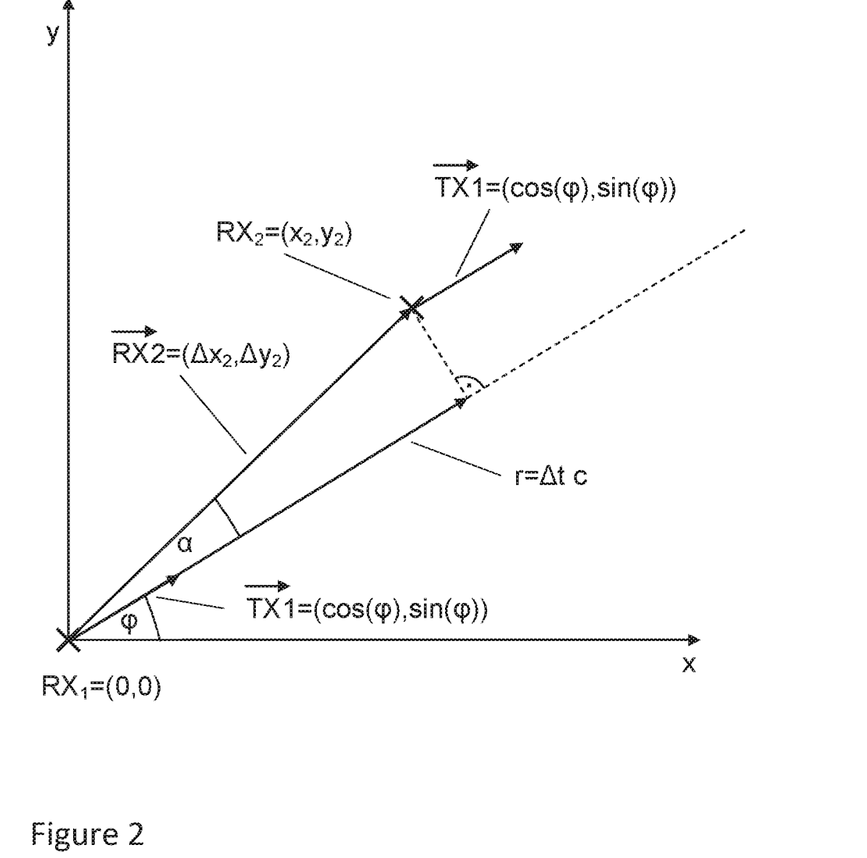
FIG. 2 depicts the vector relationships between two sensor nodes of the sensor network; and, FIG. 3 depicts the virtual bandwidth expansion attained by using a plurality of signals of a transmitter

FIG. 2 depicts the first sensor node as anchor node $RX_1$ and the second sensor node as sensor node $RX_2$. The x-y coordinates of the anchor node $RX_1$ are $(x_1, y_1)=(0,0)$. The sensor node $RX_2$ has the unknown coordinates $(x_2, y_2)$.

For determining the position, the anchor node $RX_1$ and the sensor node $RX_2$ each record a segment of the signal of opportunity of a first transmitter, beginning at a predefined time $t_1$, for a predefined time period $t_{RX}$.

Then the anchor node $RX_1$ transmits the segment of the signal of opportunity it recorded to the sensor node $RX_2$. It is also possible to transmit a metric of the recorded segment of the signal of opportunity with time variant features, the metric defined according to a predefined rule, instead of the recorded segment of the signal of opportunity. For instance, the phase position of the received signal, channel poise response, peak-to-average ratio, or certain transmitted information such as the position or interval of pilot carriers in the transmitted signal may be used as metrics.

Then the sensor node determines the propagation time difference $\Delta t$ of the signal segments recorded by the anchor node $RX_1$ and by the sensor node $RX_2$. This may occur, for instance, by determining the maximum of the autocorrelation function of both signal segments. This permits a particularly simple embodiment of the receiver for the signal of opportunity, since the receiver merely has to record a signal segment of a certain length from the signal of opportunity. Decoding, for instance of the payload data transmitted, is not necessary for determining the position.

Alternatively, the propagation time difference $\Delta t$ may be determined using one or a plurality of the metrics mentioned in the foregoing.

Furthermore, the anchor node $RX_1$ determines the angle of incidence $\varphi$ of the signal of opportunity it receives and transmits the latter to the sensor node $RX_2$.

The propagation time difference $\Delta t$ of the signal segments recorded by the anchor node $RX_1$ and by the sensor node $RX_2$ is proportional to the difference in distance between the sensor nodes and the site of the transmitter of the signal of opportunity. The propagation time difference $\Delta t$ may be converted to a difference in distance r using the speed of light c. Moreover, the vector TX1 may be depicted in the direction of the site of the transmitter of the signal of opportunity as the unit vector of the length 1 and may be defined as:

$$TX1 = \cos\varphi / \sin\varphi \tag{1}$$

The vector RX2 from the coordinate origin, i.e., from the anchor node $RX_1$, in the direction of the sensor node $RX_2$ is defined as $$RX2 = \Delta x_1 / \Delta y_2 \tag{2}$$

where $\Delta x_2$ is the distance $x_1 - x_2$ and $\Delta y_2$ is the distance $y_1 - y_2$. The angle $\alpha$ is defined as the angle difference between the angle of incidence $\varphi$ of the signal of opportunity and the angle between the vectors TX1 and RX2 relative to the coordinate system. The angle $\alpha$ may be calculated using the scalar product:

$$\cos\alpha = (TX1 \cdot RX2)/(|TX1| \cdot |RX2|) \tag{3}$$

In addition:

$$\cos\alpha = r/|RX2| = \Delta t_{TX1} \cdot c/|RX2| \tag{4}$$

Equating formulas (3) and (4), and taking into account that $|TX1|=1$, yields:

$$\Delta t_{TX1} \cdot c = \Delta x_2 \cdot \cos\varphi + \Delta y_2 \cdot \sin\varphi \tag{5}$$

Formula (5) is an equation with two unknowns $\Delta x_2$ and $\Delta y_2$. It is therefore necessary to evaluate a second signal of opportunity to determine the positions of the sensor node relative to the anchor node. Using formula (5) on a first signal of opportunity with the vector TX1, angle of incidence $\varphi_1$, and propagation time difference $\Delta t_{TX1}$ and a second signal of opportunity with the vector TX1, angle of incidence $\varphi_2$ and propagation time difference $\Delta t_{TX2}$ results in a solvable system of linear equations with the formulas (6) and (7), with which system $\Delta x_2$ and $\Delta y_2$ and therefore the coordinates $x_2$ and $y_2$ of the sensor node $RX_2$ may be determined:

$$\Delta t_{TX1} \cdot c = \Delta x_2 \cdot \cos\varphi_1 + \Delta y_2 \cdot \sin\varphi_1 \tag{6}$$

$$\Delta t_{TX2} \cdot c = \Delta x_2 \cdot \cos\varphi_2 + \Delta y_2 \cdot \sin\varphi_2 \tag{7}$$

As is described in even greater detail in the following, anchor node and sensor node determine the pre-defined time $t_1$ that is relevant for determining the propagation time difference $\Delta t$ and the time period $t_{RX}$ based on the same reference frequency. Thus the time period $t_{RX}$ may be assumed to be equal, while the timing circuits in the anchor node and sensor node may have an offset, i.e., the time $t_1$ may be different in the anchor node and in the sensor node relative to a reference time. This offset goes into the determination of position as an error. Accounting for the offset in formula (5) as offset yields:

$$(\Delta t_{TX1} - \tau) \cdot c = \Delta x_2 \cdot \cos\varphi + \Delta y_2 \cdot \sin\varphi \tag{8}$$

Formula (8) is an equation with three unknowns $\Delta x_2$, $\Delta y_2$ and $\tau$. With the evaluation of three signals of opportunity as described in the foregoing, and use of formula (8) on three signals of opportunity, the result is again a solvable system of equations, and better accuracy in determining the position may be attained.

If, as depicted in FIG. 1, the distance between the transmitters of the signals of opportunity is greater by a multiple than the extension of the sensor network, the angle of incidence $\varphi$ at each sensor node may be assumed to be equal. This permits a cost-effective embodiment of the sensor nodes, since the angle of incidence $\varphi$ for a signal of opportunity must merely be determined by only one of the sensor nodes in the sensor network, for instance the anchor node. A difference $\Delta\varphi$ of the angle of incidence of the signal of opportunity at the sensor node may likewise be taken into account in formula (5), yielding the following:

$$\Delta t_{TX1} c = \Delta x_2 \cdot \cos(\varphi + \Delta\varphi) + \Delta y_2 \cdot \sin(\varphi + \Delta\varphi) \tag{9}$$

Formula (9) is an equation with three unknowns $\Delta x_2$, $\Delta y_2$, and $\Delta\varphi$. With the evaluation of three signals of opportunity as described in the foregoing, and use of formula (9) on three signals of opportunity, the result is again a solvable system of equations, and better accuracy in determining the position may be attained.

The angle of incidence of the signal of opportunity at a sensor node may be determined with various known methods. One option is receiving the signal of opportunity with a plurality of antennas spatially separated at defined distances at the site of the sensor node and the determining, as already described, the propagation time differences of the signal of opportunity between the antennas. The angle of incidence of the signal of opportunity may be determined based on the known antenna distances and the propagation time difference. With three spatially separated antennas at the site of the sensor node, the angle of incidence of the signal of opportunity may be unambiguously determined, that is, it may be determined with a range of unambiguity of 360 degrees.

With two spatially separated antennas at the site of the sensor node, the angle of incidence of the signal of opportunity may be determined with a range of unambiguity of 180 degrees Using a suitable statistical evaluation of the angles of incidence of the signal of opportunity determined for a plurality of sensor nodes, the range of unambiguity may be expanded to 360 degrees. To this end, the sensor nodes may be configured to exchange the measured angles of incidence of the signal of opportunity with one another.

Alternatively, the angle of incidence of the signal of opportunity may be determined with an antenna array.

If the transmitter sites of the signal of opportunity are known, and an estimated position of the sensor nodes is known, for instance if a position within the extension of the sensor network is known, the angle of incidence may also be calculated directly or stored in a data base.

For high accuracy in determining the position of the sensor nodes in the sensor network it is necessary that the sensor nodes are frequency-synchronized, i.e., if the aforesaid times $t_1$ and the time period $t_{RX}$ are determined by the sensor nodes with reference to a specific reference frequency. As formula (8) indicates, differences in the times $t_1$ during the recording of the segments of the signal of opportunity may be compensated in the sensor nodes if the time period $t_{RX}$ is determined by the sensor nodes with respect to the same reference frequency. This means that the sensor nodes should use the same time basis, for instance the same reference frequency, for determining at least $t_{RX}$.

This reference frequency may be obtained from the signal of opportunity by the sensor nodes, for instance, and may be used for correcting a local reference frequency generated in the sensor node. The aforesaid television or broadcast signals (DVB-T, DAB) that are suitable signals of opportunity, or even signals from communication networks (GSM, UMTS, LTE), are normally generated with reference to a highly precise reference frequency. The following describes the generation of a frequency reference signal using the example of a signal of opportunity modulated with an OFDM (orthogonal frequency division multiplexing) method, as is used, for instance, for digital video broadcasting terrestrial reception (DVB-T).

An OFDM-modulated signal comprises a plurality of narrow-band individual carriers having a constant frequency separation, wherein the individual carriers are again modulated with a modulation method such as quadrature phase shift keying (QPSK) or quadrature amplitude modulation with 16 or 64 symbols (16 QAM or 64 QAM). During generation of an OFDM-modulated signal, the same, highly accurate reference frequency is used for generating the sampling clock and generating the carrier frequency, Certain individual carriers are modulated with a known, pre-specified symbol sequence. Individual carriers modulated in this manner are also called pilot carriers and the corresponding symbol sequence is also called a pilot signal. In the temporal sequence of the transmitted signal, the pilot signal is transmitted continuously on a part of the individual carriers. These individual carriers are also called pilot carriers. In addition, other individual carriers periodically transmit the pilot signal instead of the payload data. The phase position and frequency position of the pilot carriers may be determined by correlating the received signal to the known symbol sequence of the pilot signal.

Receivers for OFDM-modulated signals determine the carrier frequency of the OFDM signal or the carrier frequencies of the individual carriers and the sampling rate for sampling the signal, likewise with respect to a local reference frequency. Frequency deviations in the local reference frequency of the receiver compared to the reference frequency of the transmitter lead to a carrier frequency offset (CFO) and/or to a sampling clock offset (SFO) of the received signal. A carrier frequency offset involves a constant phase offset on all individual carriers between temporally successive symbols. A sampling clock offset leads to a linearly increasing or decreasing mutual phase offset of the individual carriers. A correction signal with which the reference frequency of the receiver is corrected may be derived from the magnitude of the phase offsets. This may occur, for instance, by means of a control loop.

With a receiver in motion, there is also Doppler frequency shift of the received signal, so that the receiver must determine and compensate the carrier frequency offset and the sampling clock offset independently of one another.

In a stationary receiver, it may be assumed that carrier frequency offset and sampling clock offsets alike are caused by a difference in the reference frequencies of transmitter and receiver. This permits the local reference frequency of the receiver to be synchronized to the reference frequency of the transmitter based on the carrier frequency offset determined by the receiver or the sampling clock offset or of the combination of carrier frequency offset and sampling clock offset.

The phase offsets caused by the carrier frequency offset and sampling dock offset may be determined, for example, for the continuously transmitted pilot carriers by correlating the received signal to the known symbol sequence of the pilot carriers. Another possibility is correlating currently received OFDM symbols to the OFDM symbols received in a previous symbol step. A phase difference may be determined, for example, as the difference in the phases of two successive symbols.

This offers improved accuracy, since in this case all of the individual carriers are taken into account. The carrier frequency offset and sampling clock offset may each be determined by means of known estimating methods.

Another improvement in the accuracy of the determination of carrier frequency offset and sampling clock offset may be achieved in that the received signal is demodulated and, using the local reference frequency, is remodulated according to the same method as the transmitted signal. The copy of the transmitted signal obtained in this way is compared to the received signal to determine deviations in the phase position of the individual carriers.

As described in the foregoing, the propagation time difference $\Delta t$ of the signal segments of the signal of opportunity recorded by the anchor node $RX_1$ and by the sensor node $RX_2$ is determined by determining the maximum of the autocorrelation function of both signal segments. The attainable accuracy P of the distance determined from the propagation time difference is essentially a function of the bandwidth B of the correlated signals and may be given as:

$$P = c/B \cdot 100 \tag{10}$$

An individual DVB-T signal, for example, has a bandwidth of 8 MHz. In a DVB-T signal, the pilot carriers occupy the outer individual carriers, so that the difference between the highest and lowest pilot carrier frequency corresponds to the bandwidth of the DVB-T signal. Due to their good signal-to-noise ratio, number and position of the pilot carriers essentially determine the value of the maximum for the autocorrelation function. The number of pilot carriers in the signal segment and the maximum intervals of the pilot carriers are essential for accuracy P. The attainable accuracy P is 37.5 cm with a DVB-T signal of the bandwidth of 8 MHz as the signal of opportunity.

Figure 3:
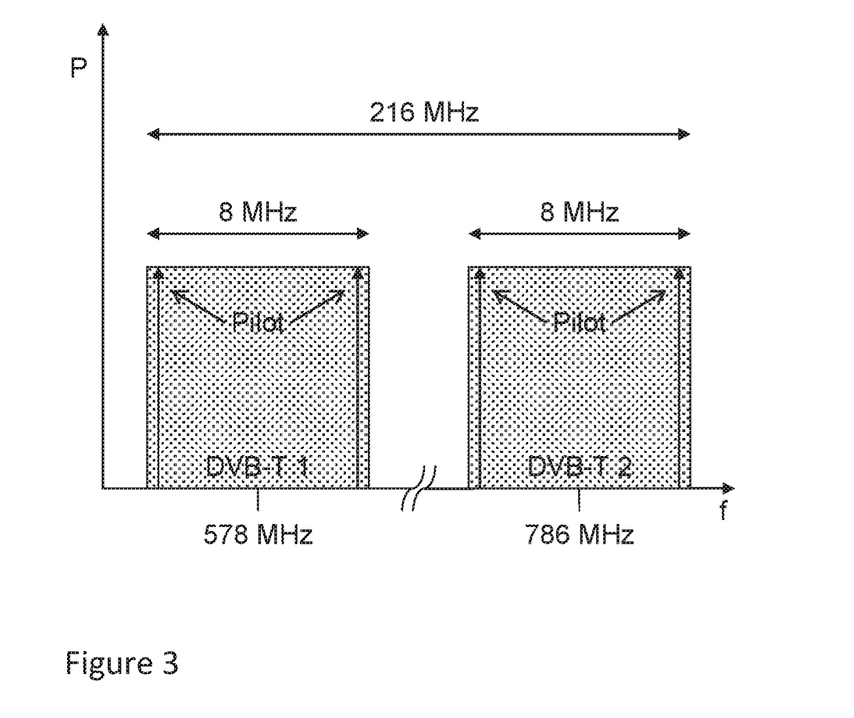

Normally a plurality of transmitted signals are emitted at different frequencies from one site, and these frequencies are generated from the same highly accurate reference frequency and are at a fixed phase relationship to one another. FIG. 3 depicts two such DVB-T signals as an example.

The accuracy P may be further improved in that signal segments of two such signals emitted from a common site are correlated to one another. The bandwidth B to be used for formula (10) equals to the difference between the highest pilot carrier frequency and the lowest pilot carrier frequency of both signals. In the example depicted in FIG. x, B is 216 MHz and the attainable accuracy P is 1.4 cm.

In another embodiment, the sensor nodes use the signal of opportunity merely for generating the reference frequency. In this embodiment, the signal of opportunity used for determining the position is emitted by the sensor node. To this end, the sensor nodes have a suitable transmitter and receiver. Moreover, every sensor node has the means, described in the foregoing, for determining the angle of incidence of this signal of opportunity. For instance, a wireless communication unit present in the sensor node and in accordance with the IEEE 802.11 standard may be used as transmitter and receiver for this purpose. The position is determined with the method described in the foregoing. In an embodiment of the method, at least one sensor node determines the reference frequency using received signals of opportunity from a transmitter outside of the sensor network, for instance from a DVB-T transmitter, and uses this reference frequency as the reference frequency for its transmitter and receiver in accordance with the IEEE 802.11 standard. The other sensor nodes in the sensor network use the signal, emitted by the sensor node, in accordance with the IEEE 802.11 standard and determine the reference frequency from this signal.

The invention claimed is:

1. A method for determining the position of a first sensor node ($RX_1$) relative to a second sensor node ($RX_2$), wherein the first and the second sensor nodes are communicatively connected to one another and are a constituent part of a sensor network, having the method steps:
   receiving signal segments of OFDM-modulated transmitted signals from at two transmitters ($TX_{SoO1}$, $TX_{SoO21}$) by the first and the second sensor nodes, beginning at time $t_1$ for a time period $t_{RX}$;
   determining the angle of incidence of the transmitted signals to at least one of the sensor nodes;
   determining the distance between the sensor nodes from the propagation time differences of the transmitted signals of the at least two transmitters received at the first and second sensor nodes; and
   determining the position of the first sensor node ($RX_1$) relative to the second sensor node ($RX_2$) from the distance between the sensor nodes and the angle of incidence of the transmitted signals
   wherein
   the sensor nodes determine the time $t_1$ and time period $t_{RX}$ relative to a reference frequency that is derived from the OFDM-modulated transmitted signal of at least one of the transmitters ($TX_{SoO1}$, $TX_{SoO2}$) received by the specific sensor node, wherein the sensor nodes determine the reference frequency using a correction signal obtained from the OFDM-modulated transmitted signal.

2. The method according to claim 1, wherein the sensor nodes determine the correction signal using a phase comparison of at least two individual carriers of the transmitted signal.

3. The method according to claim 1, wherein the sensor nodes determine the correction signal by evaluating the phase difference.

4. The method according to claim 1, wherein the sensor nodes determine the correction signal using a phase comparison of an individual carrier of the transmitted signal with an immediately, previously received individual carrier of the transmitted signal.

5. The method according to claim 1, wherein the sensor nodes determine the correction signal using a comparison of the transmitted signal with a signal that was generated by modulating the demodulated transmitted signal.

6. The method according to claim 1, wherein the propagation time difference is determined as the maximum of the autocorrelation function of the signal segments of the transmitted signal received by the first and second sensor nodes.

7. The method according to claim 1, wherein the transmitted signal is received by a sensor node with a plurality of spatially separated antennas and the angle of incidence of the transmitted signal is determined from the propagation time difference of the received signals.

8. The method according to claim 1, wherein the received signal segments of a transmitter comprise signal segments of a plurality of transmitted signals emitted at different frequencies.

9. The method according to claim 1, wherein the position of the first sensor node is determined in the first sensor node, and the second sensor node transmits the signal segments of the transmitted signals it received and the angle of incidence of the transmitted signals to the first sensor node.

10. The method according to claim 1, wherein the transmitted signals are emitted by sensor nodes.

11. A system having a sensor network and at least two transmitters that emit an OFDM-modulated transmitted signal, wherein the sensor network has at least a first and a second sensor node that are communicatively connected to one another and each of which has a transmitter/receiver device, wherein the sensor nodes are configured to determine the position of a first sensor node ($RX_1$) relative to a second sensor node ($RX_2$), wherein the first and the second sensor nodes are communicatively connected to one another and are a constituent part of a sensor network, including:
   receiving signal segments of OHM-modulated transmitted signals from at two transmitters ($TX_{SoO1}$, $TX_{SoO21}$) by the first and the second sensor nodes, beginning at tune $t_1$ for a time period $t_{RX}$;
   determining the angle of incidence of the transmitted signals to at least one of the sensor nodes;
   determining the distance between the sensor nodes from the propagation time differences of the transmitted signals of the at least two transmitters received at the first and second sensor nodes; and
   determining the position of the first sensor node ($RX_1$) relative to the second sensor node ($RX_2$) from the distance between the sensor nodes and the angle of incidence of the transmitted signals
   wherein the sensor nodes determine the time $t_1$ and time period $t_{RX}$ relative to a reference frequency that is derived from the OHM-modulated transmitted signal of at least one of the transmitters ($TX_{SoO1}$, $TX_{SoO2}$) received by the specific sensor node, wherein the sensor nodes determine the reference frequency using a correction signal obtained from the OFDM-modulated transmitted signal.

12. The system of claim 11, wherein the sensor nodes are configured to determine the correction signal using a phase comparison of at least two individual carriers of the transmitted signal.

13. The system of claim 11, wherein the sensor nodes determine the correction signal by evaluating the phase difference.

14. The system of claim 11, wherein the sensor nodes determine the correction signal using a phase comparison of an individual carrier of the transmitted signal with an immediately previously received individual carrier of the transmitted signal.

15. The system of claim 11, wherein the sensor nodes determine the correction signal using a comparison of the transmitted signal with a signal that was generated by modulating the demodulated transmitted signal.

16. The system of claim 11, wherein the propagation time difference is determined as the maximum of the autocorrelation function of the signal segments of the transmitted signal received by the first and second sensor nodes.

17. The system of claim 11, wherein the transmitted signal is received by a sensor node with a plurality of spatially separated antennas and the angle of incidence of the transmitted signal is determined from the propagation time difference of the received signals.

18. The system of claim 11, wherein the received signal segments of a transmitter comprise signal segments of a plurality of transmitted signals emitted at different frequencies.

19. The system of claim 11, wherein the position of the first sensor node is determined in the first sensor node, and the second sensor node transmits the signal segments of the transmitted signals it received and the angle of incidence of the transmitted signals to the first sensor node.

20. The system of claim 11, wherein the transmitted signals are emitted by sensor nodes.

* * * * *